United States Patent Office

2,930,815
Patented Mar. 29, 1960

2,930,815

PREPARATION OF THIOETHERS

John J. Nedwick, Philadelphia, and John Robert Snyder, Malvern, Pa., assignors to Rohm & Haas Company, Philadelphia, Pa., a corporation of Delaware No Drawing. Application January 27, 1959
Serial No. 789,256

20 Claims. (Cl. 260—607)

This application is a continuation-in-part of our application Serial No. 538,768, filed on October 5, 1955, now abandoned.

This invention concerns a method for preparing thioethers having an S-vinyl group. The method comprises mixing a thiol, an alcohol, a catalyst, and an acetylene solvent, dissolving acetylene in the resulting mixture at low temperature under pressure until an amount of acetylene is present therein about at least equivalent to the thiol, and heating in liquid phase the mixture containing acetylene at a reacting temperature under a pressure sufficient to prevent desorption of acetylene.

Formation of thioethers having an S-vinyl group has been accomplished by passing a mixture of acetylene and an inert gas into a heated thiol containing an alkali metal, zinc, or cadmium compound. While vinyl thioethers are formed, a molecule of the thiol tends to add to the vinyl compound to give dithio ethers, thus

$$RSCH=CH_2 + RSH \rightarrow RSCH_2CH_2SR$$

the extent of this reaction depending upon the thiol, catalyst, and other conditions, which are not always readily controlled. The handling of acetylene under these conditions presents a distinct hazard, which is mitigated only in part by the use of an inert gas as a diluent. This, however, necessitates handling and recirculating large volumes of gas. Under the originally proposed conditions, the art shows that the reaction was relatively slow.

One of the difficulties encountered in this reaction system, we have observed, arose from the insolubility in the reaction system of added catalyst or mercaptide formed therefrom. The insoluble material may settle out or become relatively ineffective for a given amount of added catalyst or require addition of relatively large proportions of catalyst. Some improvement was noted by suspending the catalyst in a system containing an inert solvent but without removal of the major cause of the difficulty.

A solvent proposed for use with dithiols was dioxane. This compound does not, however, prevent separation of metal mercaptide, but rather provides a diluted reaction medium in which catalyst can more readily be held in suspension by stirring while acetylene gas is pressed in continuously at reacting temperatures. The methods of the art applied to thiols or dithiols in the presence of a diluent still present the hazards and limitations above noted.

In our process, we use acetylene without or with dilution. Since the acetylene is supplied to the reaction mixture only while at low temperature, the hazard of supplying the gas to the system at reacting temperatures is avoided. Acetylene is, of course, handled with known precautions, such as use of small tubes and flash arrestors. In the absorption vessel, it is desirable to have as small a free volume of gas as is practicable. If so desired, the acetylene supplied for absorption may contain an inert gas, which serves as a diluent. Since inert gases, such as nitrogen or methane, have low solubility in the reaction mixture, they are left unabsorbed and can be taken off and readily recirculated.

We pass acetylene into a solution comprising thiol, alcohol, acetylene solvent, and catalyst while this mixture is at a temperature below 10° C., temperatures from 10° to —20° C. being generally useful. With proper selection of conditions, solvent, and alcohol, and use of these in proportions described below and under pressures up to about 30 atmospheres, there is introduced at least sufficient acetylene to react with practically all of the thiol. An excess of acetylene on thiol is often desirable, because under these conditions the thiol is substantially converted to vinyl sulfide and a troublesome side reaction of unconverted thiol with vinyl sulfide is thereby avoided.

The mixture charged with acetylene is now passed entirely in liquid phase through a heating zone, where the mixture is heated to a reacting temperature between 100° and 200° C., preferably 140° to 190° C. Residence time at these temperatures need not be over ten minutes for practically complete conversion to the vinyl thioether. Times of 0.5 to 10 minutes are usual, although longer residence times do no harm under the described conditions.

In the reaction zone or heating zone, the liquid mixture is held under pressure sufficient to prevent desorption of acetylene and to maintain the mixture entirely in the liquid state. Pressures of about 1000 to 5000 p.s.i. or more are used.

The reaction mixture is now worked up to give the desired vinyl thioether. This requires release of pressure with degassing as needed and distillation of various components of the reaction mixture. The solvent, alcohol, and catalyst are recycled while the vinyl thioether may be purified as desired. One of the advantages of this process resides in the lack of contamination of solvents and catalyst which permits their reuse with the minimum of treatment or purification.

As thiols, there may be used many kinds and types of both monothiols and polythiols. Thiols, the residues of which are free of substituents providing acidic hydrogen and free of olefinic or acetylenic unsaturation, are used. Such groups as acid sulfonate or carboxylate or strongly acidic hydrogen on carbon activated by a contiguous group like a nitro group interfere with the reaction by destroying the catalyst. Unsaturation of the types mentioned may interfere with the desired reaction apparently in a number of ways.

Particularly useful thiols may be summarized by the formula $R(SH)_n$, where $n$ is a small integer, particularly one or two, and R is an alkyl, cycloalkyl, aralkyl, or aryl group or such groups having substituents inert to the basic catalysts here used, including ethers, ester (under the conditions of the process of the present invention), hydroxy, amino, and heterocyclic groups, or alkylene, phenylene, phenylenedialkylene, etc. Typical thiols are: methanethiol, ethanethiol, 1-butanethiol, 2-butanethiol, 1-hexanethiol, 2-ethyl-1-hexanethiol, 1-octanethiol, 2-octanethiol, 2-methyl-2-propanethiol, 1,1,3,3-tetramethylbutanethiol, decanethiol, tetradecanethiol, hexadecanethiol, octadecanethiol, cyclohexanethiol, 3-methylcyclohexanethiol, 4-butylcyclohexanethiol, benzenethiol, 2-, 3-, or 4-methylbenzenethiol, 4-butylbenzenethiol, 2-naphthalenethiol, 8-bromo-1-naphthalenethiol, thioresorcinol, α-toluenethiol, α-methyl-α-toluenethiol, 2- benzeneethanethiol, 3-benzenepropanethiol, cyclohexanemethanethiol, 3-methylcyclohexanemethanethiol, 1,2-ethanedithiol, 1,2-propanedithiol, 1,3-propanedithiol, 1,2-, 1,3-, 1,4-, or 2,3-butanedithiol, 1,5-pentanedithiol, hexanedithiols, octanedithiols, α,α'-xylenedithiol, benzenedithiols, dimercaptoethyl ether, 2-mercaptabenzothiazole, thiophenemethanethiol, tetrahydro-2-furanmethanethiol, 2-methoxyethanethiol, 2-butoxy ethanethiol, 2-octoxyethanethiol, ethoxyethoxyethanethiol, butoxyethoxyethanethiol, 2-phenoxyethanethiol, ethylthioethanethiol, 2-aminoethanethiol, 2-dimethylaminoethanethiol, 3-dimethylaminopropanethiol, 2-aminobenzenethiol, chlorobenzenethiol, methylbenzenethiol, butylbenzenethiol, N-methylaminoethanethiol, N-octylaminoethanethiol, 2-morpholinoethanethiol, 2-piperidinoethanethiol, mercaptoethanol, mercaptopropanol, 1,3-dimercapto-2-propanol, 3-mercapto-1,2-propanediol, 3-mercaptopropionitrile, methyl mercaptoacetate, butyl mercaptoacetate, methoxyethyl mercaptoacetate, diethylaminoethyl mercaptoacetate, cyanoethyl mercaptoacetate, ethyl 4-mercaptobutyrate, mercaptoacetamide, N-methyl mercaptoacetamide, N,N-dimethyl mercaptoacetamide, and other N-alkyl acetamides having mercapto groups.

Interesting subclasses of thiols which are useful in the process of this invention may be summarized by the formula $R(SH)_n$, where $n$ has a value of one or two and R is chosen from one of the following: (1) a saturated aliphatic hydrocarbon group, including both alkyl radicals and alkylene radicals, (2) a group having saturated aliphatic hydrocarbon residues, particularly those of not over eight carbon atoms, and a substituent from the class consisting of ether, thioether, carboxylic ester, amide, amine, and hydroxyl groups, (3) an aryl group, preferably a phenyl group, and (4) an aralkyl group, preferably a phenyl alkyl group.

In fact, there may be used any thiol which is not decomposed by a strong alkali under the conditions here used for vinylation. Because the conditions of the present process are in general milder than in some previous procedures and the times of reaction are relatively short, many HS-compounds can be used where the comparable HO-analogues cannot be.

As solvents which have a high capacity for dissolving acetylene there are used organic solvents which have an alpha value, a solubility value expressed in terms of volume of acetylene measured under standard conditions per volume of solvent, of at least about 18 or better about 20 or more at 0° C. and atmospheric pressure. The solvents should have an alpha value of about 14 at 10° C. The solvent must be inert with respect to catalyst, alcohol, thiol, and acetylene, except for dissolving it, and miscible with the alcohol and the thiol being reacted, capable of giving a fluid mixture with thiol, alcohol, and catalyst at about 0° C., and capable of being separated from the other components of the reaction mixture.

Solvents which meet the above requirements are found in several classes of organic liquids. The broadest class of liquid solvents is based on ethers, particularly upon polyethers, which provide considerable choice with varying solubilities, miscibilities, freezing points, distillation ranges, and other factors. Useful polyethers include dimethyl formal, diethyl formal, dimethyl acetal, diethyl acetal, dioxane, dioxolane, 2-methyl-dioxolane, and the monomethyl, dimethyl, monoethyl, and diethyl ethers of ethylene glycol, diethylene glycol, triethylene glycol, or tetraethylene glycol. Other ethers include tetrahydrofuran and ethyl ether and ethers having oxygen replaced by sulfur, as in $CH_3OCH_2CH_2SCH_2CH_2OCH_3$, or the comparable diethyl ether compounds which are also polyethers. Some miscellaneous compounds which are useful include N-methylpyrrolidone and N-ethylpyrrolidone. Solubility coefficients of typical useful solvents are shown in Table I. Mixtures of two or more acetylene solvents may be used as well as individual solvents.

TABLE I

*Acetylene solubility values (α)*

| Compound | α 0° C. | α 10° C. |
| --- | --- | --- |
| Tetrahydrofuran | 37.4 | 27.8 |
| Methylal | 36.0 | 24.3 |
| Diethyl Ether of Diethylene Glycol | 30.0 | 21.1 |
| Dimethoxyethane | 27.6 | 22.8 |
| 2-Methyl-1,3-dioxolane | 26.2 | 20.1 |
| Diethoxyethane | 25.2 | 18.6 |
| Methoxyethanol | 22.7 | 16.5 |
| Diethyl Ether | 19.8 | 14.8 |
| Ethoxyethanol | 18.9 | 14.1 |
| Acetal | 18.2 | 13.6 |
| Dimethyl Ether of Triethylene Glycol | 20.4 | 15.5 |
| N-Methyl Pyrrolidone | 53.6 | 41.8 |

The amount of acetylene solvent in the reaction mixture is usually 10% to 50% thereof, somewhat more or less being used in some cases. The important consideration is to use enough solvent to insure that any given reaction system will dissolve about at least a stoichiometric amount of acetylene based on the thiol content of this mixture at the reduced temperature under pressure.

There are some instances where a single compound provides both the function of an acetylene solvent and that of an alcohol. It can, therefore, be considered as both an acetylene solvent and an alcohol and be used in proportions for both.

In addition to an acetylene solvent, there is generally used an alcohol. The alcohol serves in part as a diluent and as a solvent for the system, maintaining homogeneity of the reaction system through serving to dissolve the catalyst bodies. Useful alcohols include principally saturated liquid alcohols which are unreactive with the thiol used and stable to strong base, such as methanol, ethanol, propanol, butanol, hexanol, octanol, dodecanol, mixtures of alkanols, including those having even as many as 18 carbon atoms, methoxyethanol, butoxyethanol, octoxyethanol, dodecyloxyethanol, phenoxyethanol, ethoxypropanol, butoxypropanol, octoxypropanol, ethoxybutanol, ethoxyethoxyethanol, methoxymethoxyethanol, butoxyethoxyethanol, ethoxypropoxyethanol, ethoxyethoxyethanol, butoxypropoxyethoxyethanol, diethylene glycol, triethylene glycol, etc. The alcohols of first choice are alkanols and saturated aliphatic ether alcohols. The former may be represented by $R_xOH$, where $R_x$ is an alkyl group or mixture thereof giving alcohols which are liquid at room temperature. The latter can be represented by $R^o(OC_mH_{2m})_xOH$, where $R^o$ is an alkyl or phenyl group, $m$ is an integer from 2 to 4, and $x$ is an integer from 1 to 3. The choice of alcohol depends upon such factors as the respective boiling points of the thiol, its vinyl sulfide, the alcohol and its vinyl ether, selection being made to insure that these materials are readily separable. Also, in the choice of an alcohol, consideration should be given to its miscibility with the other materials used, to its solubilizing action on the catalyst bodies, and to the particular procedure used. Reaction of alcohol with acetylene is not a source of concern, as reaction of alcohol with acetylene is relatively small in the presence of the reaction of thiol and acetylene under the conditions of this process.

In general, the proportion of alcohol used should be sufficient to keep the catalyst in solution and, therefore, maintain the reaction mixture homogeneous. The percentage of the alcohol in the reaction mixture will vary with choice of alcohol solvent, thiol, and catalyst.

The amount of alcohol used should in general be proportional to the amount of catalyst used. Usually, the alcohol will make up 20% to 35% of the reaction mixture, although under special circumstances it may be 10% to 75% of the reaction mixture, the higher proportion being used when the alcohol also acts as an acetylene solvent, as noted above.

There is another special situation where the alcohol is provided as a part of the thiol, as in mercaptoethanol or mercaptopropanol. Here, the compound serves both as reactant and as an alcohol and separate addition of another alcohol is not essential, although, if desired, another alcohol may be added.

The compounds which may be added as catalysts include the alkali metals, their oxides, hydroxides, cyanides, sulfides, alcoholates, and mercaptides. There may be used such an alcoholate as lithium, sodium, or potassium methylate, ethylate, or butylate, or the alkali metal alcoholate of the alcohol used as solvent, including alkanols or ether alcohols as mentioned above or other alcohols as defined above. Sometimes it is convenient to use an alkali metal mercaptide, particularly of the thiol to be reacted. This is best taken up in the alcohol used in the reaction mixture.

The amount of catalyst used is normally about 1% to 10% of the thiol and is usually preferably about 2% to 5% of the thiol, these percentages being on a molar basis. There are cases, however, where greater than ten mole percent is desirable; for example, proportions may be used even equivalent to the reactive thiol. For example, with the 1,2-ethanedithiols there is used for best results a stoichiometric proportion of catalyst, since in the presence of smaller proportions of catalyst, ethylene sulfide polymers tend to predominate as products.

Details of typical procedures for preparing S-vinyl ethers are presented in the following illustrative examples, wherein parts are by weight unless otherwise designated.

EXAMPLE 1

Under a nitrogen blanket, 4.1 parts of sodium was added to 237 parts of n-butanol. After the sodium was dissolved, additions were made of 376 parts of dodecanethiol and 127 parts of methylal. This mixture was cooled to about 0° C. and treated with acetylene until 78 parts were absorbed, a pressure of 240 p.s.i.g. being required. The liquid mixture was then passed under pressure sufficient to prevent desorption of acetylene through a heated reaction zone where a temperature of 188°–190° C. was reached. Residence time in this zone was 5.6 minutes. The reaction mixture was taken from the reaction zone, pressure was released, and the mixture was flash-distilled under reduced pressure. The resulting distillate was carefully fractionated. Methylal was recovered at 42°–44° C. A fraction of butanol and butyl vinyl ether was taken at 59°–64° C./60 mm. From this 15 parts of butyl vinyl ether was obtained. At 124°–126° C./1.7 mm. there was obtained dodecyl vinyl sulfide in a conversion of 92% based on the dodecanethiol.

EXAMPLE 2

(a) A solution of 3.3 parts of sodium was made in 74 parts of n-butanol. This solution was mixed with 235 parts of mercaptoethanol and 172 parts of dimethoxymethane. The resulting mixture was cooled to 4° C. and treated with acetylene under pressure until 106 parts were absorbed, the equilibrium pressure being 210 p.s.i.g. The liquid mixture was pumped through a heated coil, a temperature of 176°–177° C. being reached. Residence time was 5.3 minutes. The reaction mixture was distilled. The desired product was obtained as a fraction distilling at 85°–86° C./20 mm. It was identified as β-hydroxyethyl vinyl sulfide. The yield was 97% based on the mercaptoethanol consumed.

(b) To 234 parts of mercaptoethanol is added six parts of sodium hydroxide, 186 parts of a commercial alcohol containing about 90% of dodecyl and tetradecyl alcohols and about 5% each of decyl and hexadecyl alcohols, and 180 parts of dimethoxyethane. This mixture is then charged to a mixing vessel and acetylene is passed thereinto until 88 parts are absorbed. The temperature is 7° to 10° C. and the pressure 250 p.s.i.g. This mixture is now passed through a heated reaction zone maintained at 150° C. Residence time is four minutes. The resulting reaction mixture is subjected to vacuum-flash distillation until all of the dimethoxyethane and β-hydroxyethyl vinyl sulfide are removed. The bottoms containing the mixture of high boiling alcohols and catalyst is then used for recycle, if so desired. The flash-distillate is fractionated under reduced pressure; dimethoxyethane comes over at 36°–37° C./140 mm. and 255 parts of β-hydroxyethyl vinyl sulfide comes over at 87° C./20 mm. The yield of vinyl sulfide is about 80%. The advantage of this particular method lies in the use of a less volatile alcohol which acts as catalyst carrier and permits recycling without complete resolution of the reaction mixture.

EXAMPLE 2–A

It will be obvious that the procedure in Example 2 (and, in fact, all the other examples herein set forth) can be modified, without departing from the scope of this invention, by varying the way in which the reactants are brought together in the liquid phase in the high temperature reaction zone. For instance, instead of dissolving the acetylene in the mixture of the acetylene solvent, alcohol, mercaptan and catalyst, the acetylene may be dissolved in the acetylene solvent alone or in the acetylene solvent plus a part of the alcohol and mercaptan. The catalyst and the remaining part or all of the alcohol and mercaptan are then mixed with this acetylene-laden stream in the high-pressure reactor system ahead of, at the start of, or at various points along the heated reaction zone.

To illustrate, the procedure of Example 2 is varied as follows: A solution of 235 parts of mercaptoethanol and 172 parts of dimethoxymethane is cooled to 4° C. and treated with acetylene under pressure until about 106 parts are absorbed, the equilibrium pressure being about 210 p.s.i.g. The liquid mixture is pumped through a heated coil, a temperature of about 176°–177° C. being reached. At the start of the heated zone a solution of about 3.3 parts of sodium dissolved in about 75 parts of n-butanol is injected into the acetylene-laden stream at a rate of 1 part of catalyst solution to 7 parts of the acetylene solution. The residence time in the heated zone is about 5 minutes. The reaction mixture is let down to atmospheric pressure and distilled. The desired product, β-hydroxyethyl vinyl sulfide, is obtained as a fraction distilling at about 85°–86° C./20 mm.

EXAMPLE 2–B

Another variation of the Example 2 process starts with a solution of 3.5 parts of sodium in about 192 parts of absolute methanol, prepared in an inert atmosphere. This is combined with about 192 parts of methylal, and the resulting mixture is charged to a mixing bomb where acetylene is absorbed at about 10° C. until approximately 98 parts of acetylene is taken up at an equilibrium pressure of about 250 p.s.i.g. This mixture, as a liquid, is passed under pressure through a heated reaction zone which is held at a temperature of about 178° C. At the start of the heated zone about 135 parts of n-butanethiol is injected into the acetylene-laden stream, and half way through the heated zone an additional 130 parts of n-butanethiol is injected. The feed rates of the streams are adjusted to a ratio of about 4:1:1 parts. The residence time in the heated zone is about six minutes. The reaction mixture is distilled under reduced pressure and the distillate is fractionated. At about 72°–73° C./54 mm. the desired n-butyl vinyl sulfide is obtained.

EXAMPLE 3

In 100 parts of anhydrous methanol there was dissolved 6.0 parts of sodium hydroxide. To this solution, there were added 270 parts of tert-butanethiol and 136 parts of methylal. Acetylene was passed into this mixture while it was cooled to about 0° C. until 98 parts had been absorbed at 250 p.s.i.g. The mixture was then passed under pressure sufficient to maintain the liquid state exclusively through a heated reaction zone where a temperature of 190° C. was reached. Residence time was 6 to 7 minutes. The reaction mixture was distilled and the distillate was fractionated. At 61° C./117 mm. a fraction of 290 parts was obtained. It was identified as tert-butyl vinyl sulfide. There is also obtained a mixture at 34°–60° C./120 mm. containing methanol and tert-butyl vinyl sulfide, from which the latter is recovered after the methanol is washed out.

EXAMPLE 4

To 210 parts of anhydrous ethanol there was added under a nitrogen blanket 4.6 parts of sodium, which was allowed to dissolve. To the resulting solution there were added 84.7 parts of dimethoxyethane and 240 parts of ethyl mercaptoacetate. This mixture was cooled to about 0° C. and charged with acetylene until 73 parts had been taken up at 200 p.s.i.g. The liquid mixture was then passed under pressure through a heated reaction zone where a temperature of 140° C. was reached. Residence time was three minutes. The reaction mixture was flash-distilled under reduced pressure and the distillate was fractionally distilled. At 83°–85° C./20 mm. a fraction of 175 parts was obtained, which corresponded in composition to $C_2H_5OOCH_2—CH_2SCH=CH_2$. This corresponds to a conversion of 60%.

EXAMPLE 5

In 452 parts of anhydrous methanol there was dissolved under nitrogen 46 parts of sodium. To this solution were added 94 parts of ethanedithiol and 83.6 parts of dimethoxyethane. The mixture was charged at about 4° C. with 72 parts of acetylene, a pressure of 300 p.s.i.g. being reached. The charged mixture was pumped under pressure sufficient to prevent any desorption of acetylene through a heated reactor where a temperature of 140° C. was reached. Residence time was three minutes. After the reaction mixture was passed through a release valve, methanol and dimethoxyethane were taken off under reduced pressure. The residue containing catalyst, product, and high-boiling by-products was dissolved in water and extracted with ethyl ether. The ether solution was evaporated to give an oil, which was distilled under reduced pressure and the distillate was fractionated. At 92° C./13 mm. there was obtained the product identified by analysis as 3,6-dithiaocta-1,7-diene in an amount of 67 parts by weight.

In the same way, other dithiols are reacted, there being used about an equivalent amount of catalyst for the dithiol, when these are 1,2-ethanedithiols. Higher dithiols do not apparently need this increased amount of catalyst. In each case, the corresponding divinyl sulfide is obtained. For example, from 1,4-xylenedithiol there is obtained 1,4-bis(vinylthiomethyl)benzene which is a solid melting at 60°–61° C.; from 1,3-propanedithiol is obtained 1,3-bis(vinylthio)propane, distilling at 60° C./0.3 mm. and having a refractive index, $n_D^{25}$, of 1.5514; from 1,4-butanedithiol is obtained 1,4-bis(vinylthio)butane, distilling at 81° C./0.75 mm.; from 1,5-pentanedithiol is obtained 1,5-bis(vinylthio)pentane, distilling at 85.5° C./0.24 mm.

EXAMPLE 6

A solution of 3.5 parts of sodium in 192 parts of absolute methanol was prepared in an inert atmosphere. This was combined with 270.5 parts of n-butanethiol and 192 parts of methylal. The resulting mixture was charged to a mixing bomb where acetylene was passed into it until 98 parts of acetylene had been absorbed at an equilibrium pressure of 250 p.s.i.g. This mixture as a liquid was passed under pressure through a heated reaction zone where a temperature of 178° C. was reached. Residence time was six minutes. The reaction mixture was distilled under reduced pressure and the distillate was fractionated. At 72°–73° C./54 mm. the desired n-butyl vinyl sulfide was obtained in an amount of 248 parts.

In the same ways as shown for reacting n-butanethiol, tert-butanethiol, or dodecanethiol, there may be reacted methanethiol, ethanethiol, 2-methyl-1-propanethiol, 1-methyl-1-propanethiol, hexanethiol, 2-ethylhexanethiol, decanethiol, or octadecanethiol to give the corresponding vinyl sulfides. Identification characteristics of typical alkyl vinyl sulfides which are thus prepared are as follows:

TABLE II

*Properties of alkyl vinyl sulfides*

| Vinyl Sulfide | B. Pt., ° C. | $d_4^{25}$ | $n_D^{25}$ |
|---|---|---|---|
| methyl | 67–67.5 | | 1.4826 |
| ethyl | 92–92.5 | 0.8723 | 1.4735 |
| isopropyl | 104.5–105 | 0.8505 | 1.4645 |
| isobutyl | 74.5–75.5/115 mm. | 0.8539 | 1.4660 |
| sec-butyl | 73–74/115 mm. | 0.8556 | 1.4683 |
| 2-ethylhexyl | 88.8/10 mm. | | 1.4602 |
| decyl | 114–116/5 mm. | | 1.4715 (20°) |
| tert-dodecyl | 88–8°/1.5 mm. | | |
| tetradecyl | 105–106/0.15 mm. | | (solid) |
| octadecyl | 160–165/0.45 mm. | | (solid) |

In place of the various alkanethiols discussed just above, there may be used in the same way cycloalkanethiols with like result. Thus, cyclohexanethiol yields cyclohexyl vinyl sulfide, distilling at 71° C./9 mm.; $n_D^{25}$ is 1.5097; $d_{25}^{25}$ is 0.9492.

EXAMPLE 7

Solution was made of 3.5 parts of sodium in 222 parts of n-butyl alcohol in a nitrogen atmosphere. To this solution were added 332 parts of thiophenol and 128 parts of methylal. The mixture was charged to a mixing bomb where acetylene was absorbed at 10° C. up to 300 p.s.i.g. total pressure. The acetylene-charged mixture was pumped through a heated reactor where it reached a temperature of 186° C. Residence time was four to five minutes. After distillation and fractionation, there was obtained phenyl vinyl sulfide in an amount of 321 parts, a yield of about 80% based on thiophenol. It distilled at 74° C./7 mm.

In the same way, there can be used p-chlorobenzenethiol, methylbenzenethiols, butylbenzenethiols, and the like, to give the corresponding substituted phenyl vinyl sulfides.

EXAMPLE 8

(a) A solution of 3.5 parts of sodium was made under a nitrogen blanket in 220 parts of n-butyl alcohol. To this solution were added 372 parts of benzyl marcaptan (α-toluenethiol) and 156 parts of methylal. The mixture was cooled to about 10° C. and acetylene was passed thereinto until 98 parts had been absorbed. The equilibrium pressure was then 270 p.s.i.g. This mixture was pumped as a liquid through a heated coil where it reached a temperature of 185° C. Residence time was four minutes. The reaction mixture was worked up in the usual way with flash-distillation followed by careful fractionation. The fraction taken at 101°–104° C./10 mm. corresponded in composition to benzyl vinyl sulfide. It was obtained in an amount of 454 parts or an 80% conversion based on the benzyl mercaptan.

(b) To 271 parts of methoxyethanol is added under a nitrogen blanket 3 parts of sodium. When the sodium has all reacted, 300 parts of benzyl mercaptan is added and the mixture charged to a mixing vessel where acetylene is passed into it until 73 parts are absorbed. The temperature is 7° C. and the pressure 280 p.s.i.g. The resulting mixture is now passed through a heated reaction zone maintained at 175° C. The residence time is 3.8 minutes.

The reaction mixture in vacuum flash-distilled and the distillate subjected to fractional distillation. The methoxyethanol plus a small amount of methoxyethyl vinyl ether comes over between 26° C./67 mm. and 48° C./37 mm.; 300 parts of benzyl vinyl sulfide comes over at 96°–98° C./10 mm. The yield of vinyl sulfide is 83%.

EXAMPLE 9

A solution was prepared from 4.9 parts of potassium in 220 parts of butyl alcohol and this was mixed with 133 parts of methylal and 312.5 parts of 2-aminobenzenethiol. The resulting mixture was treated with acetylene and chilled below 0° C. until 87 parts of acetylene was absorbed, the equilibrium pressure being 280 p.s.i.g. The liquid mixture was pumped under pressure to prevent desorption of acetylene through a heated coil, a temperature of 185° C. being reached and the residence time being 4.5 minutes. The reaction mixture was worked up as above with flash-distillation of the mixture followed by fractionation. The fraction containing the desired product, 2-aminophenyl vinyl sulfide, was obtained at 110.5°–112° C./5 mm.. The yield was 70%.

EXAMPLE 10

To 202 parts of n-butyl alcohol is added under a nitrogen blanket 6 parts of potassium. When all of the potassium has reacted, 250 parts of 2-aminoethanethiol and 114 parts of dimethoxyethane are added. This mixture is now charged to a mixing vessel where acetylene is passed into it until 98 parts are absorbed at a temperature of 10° C. and a pressure of 310 p.s.i.g. The mixture is now passed through a heated reaction zone, residence time being four minutes at 175° C. The resulting reaction mixture is degassed and vacuum flash-distilled. The distillate is subjected to fractional distillation; n-butyl alcohol and some n-butyl vinyl ether came over between 35° and 60° C./60 mm. The 2-aminoethyl vinyl sulfide comes over at 66°–67° C./20 mm. and is obtained in 55% yield.

In the same way, there is used N-methylaminoethanethiol, N,N-dimethylaminoethanethiol, N,N-diethylaminoethanethiol, N,N-dibutylaminoethanethiol, 4-aminobutanethiol, 4-N-methylaminobutanethiol, 4-N,N-dimethylaminobutanethiol, 2-morpholinoethanethiol, 2-pyrrolidinoethanethiol, 2-piperidinoethanethiol, or other heterocyclic aminoalkanethiol. In every case, there is formed vinyl thioether.

By the procedures described above, there may be prepared as other typical thioethers phenoxyethyl vinyl sulfide, distilling at 89° C/0.65 mm. and having a refractive index, $n_D^{25}$, of 1.5633 and a density, $d_{25}^{25}$, of 1.0791; tetrahydrofurfuryl vinyl sulfide, distilling at 84° C./10.5 mm. and having a refractive index, $n_D^{25}$, of 1.5097 and a density, $d_{25}^{25}$, of 1.0393; or phenyl vinyl sulfide, distilling at 78° C./3 mm. and having a refractive index $n_D^{25}$, of 1.5972 and a density, $d_{25}^{25}$, of 1.1868.

The process of this invention is direct and safe and is readily amenable to continuous and/or cyclic operation with maximum utilization of all materials. It avoids handling acetylene as a gas at high temperatures under pressure. It gives high conversions and yields with avoidance of by-products.

The vinyl thioethers are useful as monomers for forming polymers, including both homopolymers and copolymers, which find use in a great variety of applications, such as coating, molding, and casting. Because of the reactive sulfur linkage and vinyl group, the vinyl thioethers serve as chemical intermediates. For example, they add compounds having reactive hdrogen across the double bond to give compounds useful for controlling pests on plants, for plasticizing resins, etc. Vinyl thioethers are also useful as insecticides, additives for lubricating oils, solvents, etc.

In the above examples, it has been shown that the reaction mixture containing a vinyl thioether is resolved with the aid of flash-distillation or a first distillation step, the purpose of which is merely to separate volatile materials from non-volatile or difficultly volatile materials. These separations are accomplished without particular attention to temperatures or pressures, except that temperatures which would cause thermal decomposition are naturally avoided. The regular procedure then is to lower the pressure, for example, below one mm. if an oil pump is used, or below 30 mm. if a water pump is used, and heat the vessel containing the reaction mixture sufficiently to distill off the volatile materials. Pot temperatures may be noted and these are generally kept below 250° C. Temperatures are carried no higher than needed to take off volatile material at the pressure available. The overhead temperature is not of importance and is usually not determined. The temperature used will, of course, depend upon the particular volatile materials present and the reduced pressure available. As noted above, all that is desired here is to separate the volatile materials so that they can be fractionated without interference from catalyst, or other non-volatile substances.

We claim:

1. A method for preparing vinyl thioethers which comprises mixing a thiol, a strongly basic alkali metal catalyst, and an inert organic solvent which dissolves at least about 18 volumes of acetylene measured at standard conditions per volume of solvent at 0° C. and one atmosphere pressure, dissolving acetylene in the resulting mixture at a temperature below about 10° C. under pressure until the dissolved acetylene is at least about equivalent to the thiol in said mixture, heating the mixture containing acetylene in liquid phase at a reacting temperature between 100° and 200° C. under pressure between about 1000 and 5000 pounds per square inch and at least sufficient to maintain the reacting mixture entirely in liquid phase and to prevent desorption of acetylene.

2. A method for preparing vinyl thioethers which comprises mixing together a thiol, $R(SH)_n$, wherein $n$ is an integer from one to two and R is chosen from one of the following: (1) a saturated aliphatic hydrocarbon group, (2) a group having saturated aliphatic hydrocarbon residues and a substituent from the class consisting of ether, thioether, carboxylic ester, amine, hydroxyl, and amide groups, (3) an aryl group, and (4) a phenalkyl group, a strongly basic alkali metal catalyst, and an inert organic solvent which dissolves at least about 18 volumes of acetylene measured at standard conditions per volume of solvent at 0° C. and one atmosphere pressure, dissolving acetylene in the resulting mixture at a temperature below about 10° C. under pressure until the dissolved acetylene is at least about equivalent to the thiol in said mixture, heating the mixture containing acetylene in liquid phase at a reacting temperature between 100° and 200° C. under pressure between about 1000 and 5000 pounds per square inch and sufficient to maintain the reacting mixture entirely in liquid phase and to prevent desorption of acetylene.

3. A method for preparing vinyl alkyl sulfides which comprises mixing together an alkanethiol, a strongly basic alkali metal catalyst, and an inert organic solvent which dissolves at least 20 volumes of acetylene measured at standard conditions per volume of solvent at 0° C. and one atmosphere pressure, dissolving acetylene in the resulting mixture at a temperature below about 10° C. under pressure until the dissolved acetylene is at least about equivalent to the thiol in said mixture, heating the mixture containing acetylene in liquid phase at a reacting temperature between 100° and 200° C. under pressure between about 1000 and 5000 pounds per square inch and sufficient to maintain the reacting mixture entirely in liquid phase and to prevent desorption of acetylene.

4. A method for preparing bis(vinylthio)alkanes which comprises mixing together an alkanedithiol, a strongly basic alkali metal catalyst in an amount about equivalent to the said alkanedithiol, and an inert organic solvent which dissolves at least 20 volumes of acetylene measured at standard conditions per volume of solvent at 0° C. and one atmosphere pressure, dissolving acetylene in the resulting mixture at a temperature below about 10° C. under pressure until the dissolved acetylene is at least about equivalent to the thiol in said mixture, heating the mixture containing acetylene in liquid phase at a reacting temperature between 100° and 200° C. under pressure between about 1000 and 5000 pounds per square inch and sufficient to maintain the reacting mixture entirely in liquid phase and to prevent desorption of acetylene.

5. A method for preparing an aminoalkyl vinyl sulfide which comprises mixing together an aminoalkanethiol, a strongly basic alkali metal catalyst, and an inert organic solvent which dissolves at least 20 volumes of acetylene measured at standard conditions per volume of solvent at 0° C. and one atmosphere pressure, dissolving acetylene in the resulting mixture at a temperature below about 10° C. under pressure until the dissolved acetylene is at least about equivalent to the thiol in said mixture, heating the mixture containing acetylene in liquid phase at a reacting temperature between 100° and 200° C. under pressure between about 1000 and 5000 pounds per square inch and sufficient to maintain the reacting mixture entirely in liquid phase and to prevent desorption of acetylene.

6. A method for preparing vinyl thioethers which comprises mixing a thiol, a lower alkanol, a strongly basic alkali metal catalyst, and an inert organic solvent having an alpha solubility value with respect to acetylene of at least about 18 at 0° C. and of at least about 14 at 10° C., dissolving acetylene in the resulting mixture at a temperature below about 10° C. under pressure until the dissolved acetylene is at least about equivalent to the thiol in said mixture, passing the mixture containing acetylene in liquid phase into a reaction zone under pressure between about 1000 and 5000 pounds per square inch and at least sufficient to maintain the reacting mixture entirely in liquid phase to prevent desorption of acetylene, then heating the liquid phase mixture at a reacting temperature of between 100° and 200° C. for at least about 0.5 minute until the reaction is completed.

7. The method of claim 6 in which the solvent is selected from the class consisting of dimethyl formal, diethyl formal, dimethyl acetal, diethyl acetal, dioxane, dioxolane, 2-methyldioxolane, the monomethyl, dimethyl, monoethyl, and diethyl ethers of ethylene glycol, diethylene glycol, triethylene glycol and tetraethylene glycol, tetrahydrofuran, ethyl ether and ethers having oxygen replaced by sulfur, N-methylpyrrolidone and N-ethylpyrrolidone.

8. A method for preparing vinyl thioethers which comprises mixing together a thiol, $R(SH)_n$, wherein $n$ is an integer from one to two and R is chosen from one of the following: (1) a saturated aliphatic hydrocarbon group, (2) a group having saturated aliphatic hydrocarbon residues and a substituent from the class consisting of ether, thioether, carboxylic ester, amine, hydroxyl, and amide groups, (3) an aryl group, and (4) a phenalkyl group, a lower alkanol, a strongly basic alkali metal catalyst, and an inert organic solvent having an alpha solubility value with respect to acetylene of at least about 18 at 0° C. and of at least about 14 at 10° C., dissolving acetylene in the resulting mixture at a temperature below about 10° C. under pressure until the dissolved acetylene is at least about equivalent to the thiol in said mixture, passing the mixture containing acetylene in liquid phase into a reaction zone under pressure between about 1000 and 5000 pounds per square inch and at least sufficient to maintain the reacting mixture entirely in liquid phase and to prevent desorption of acetylene, then heating the liquid phase mixture at a reacting temperature of between 100° and 200° C. for at least about 0.5 minute until the reaction is completed.

9. The method of claim 8 in which the solvent is selected from the class consisting of dimethyl formal, diethyl formal, dimethyl acetal, diethyl acetal, dioxane, dioxolane, 2-methyl-dioxolane, the monomethyl, dimethyl, monoethyl, and diethyl ethers of ethylene glycol, diethylene glycol, triethylene glycol and tetraethylene glycol, tetrahydrofuran, ethyl ether and ethers having oxygen replaced by sulfur, N-methylpyrrolidone and N-ethylpyrrolidone.

10. A method for preparing vinyl alkyl sulfides which comprises mixing together an alkane thiol, a lower alkanol, a strongly basic alkali metal catalyst, and an inert organic solvent having an alpha solubility value with respect to acetylene of at least about 18 at 0° C. and of at least about 14 at 10° C., dissolving acetylene in the resulting mixture at a temperature below about 10° C. under pressure until the dissolved acetylene is at least about equivalent to the thiol in said mixture, passing the mixture containing acetylene in liquid phase into a reaction zone under pressure between 1000 and 5000 pounds per square inch and at least sufficient to maintain the reacting mixture entirely in liquid phase and to prevent desorption of acetylene, then heating the liquid phase mixture at a reacting temperature of between 100° and 200° C. for at least about 0.5 minute until the reaction is completed.

11. The method of claim 10 in which the solvent is selected from the class consisting of dimethyl formal, diethyl formal, dimethyl acetal, diethyl acetal, dioxane, dioxolane, 2-methyl-dioxolane, the monomethyl, dimethyl, monoethyl, and diethyl ethers of ethylene glycol, diethylene glycol, triethylene glycol and tetraethylene glycol, tetrahydrofuran, ethyl ether and ethers having oxygen replaced by sulfur, N-methylpyrrolidone and N-ethylpyrrolidone.

12. A method for preparing bis(vinylthio)alkanes which comprises mixing together an alkane dithiol, a strongly basic alkali metal catalyst in an amount about equivalent to the said alkanedithiol, a lower alkanol, and an inert organic solvent having an alpha solubility value with respect to acetylene of at least about 18 at 0° C. and of at least about 14 at 10° C., dissolving acetylene in the resulting mixture at a temperature below about 10° C. under pressure until the dissolved acetylene is at least about equivalent to the thiol in said mixture, passing the mixture containing acetylene in liquid phase into a reaction zone under pressure between about 1000 and 5000 pounds per square inch and at least sufficient to maintain the reacting mixture entirely in liquid phase and prevent desorption of acetylene, then heating the liquid phase mixture at a reacting temperature of between 100° and 200° C. for at least about 0.5 minute until the reaction is completed.

13. The method of claim 12 in which the solvent is selected from the class consisting of dimethyl formal, diethyl formal, dimethyl acetal, diethyl acetal, dioxane, dioxolane, 2-methyl-dioxolane, the monomethyl, dimethyl, monoethyl, and diethyl ethers of ethylene glycol, diethylene glycol, triethylene glycol and tetraethylene glycol, tetrahydrofuran, ethyl ether and ethers having oxygen replaced by sulfur, N-methylpyrrolidone and N-ethylpyrrolidone.

14. A method for preparing an aminoalkyl vinyl sulfide which comprises mixing together an aminoalkanethiol, a lower alkanol, a strongly basic alkali metal catalyst, and an inert organic solvent having an alpha solubility value with respect to acetylene of at least about 14 at 10° C., dissolving acetylene in the resulting mixture at a temperature below about 10° C. under pressure until the dissolved acetylene is at least about equivalent to the thiol in said mixture, passing the mixture containing acetylene in liquid phase into a reaction zone under pressure between about 1000 and 5000 pounds per square inch and at least sufficient to maintain the reacting mixture entirely in liquid phase and to prevent desorption of acetylene, then heating the liquid phase mixture at a reacting temperature of between 100° and 200° C. for at least about 0.5 minute until the reaction is completed.

15. The method of claim 14 in which the solvent is selected from the class consisting of dimethyl formal, diethyl formal, dimethyl acetal, diethyl acetal, dioxane, dioxolane, 2-methyl-dioxolane, the monomethyl, dimethyl, monoethyl and diethyl ethers of ethylene glycol, diethylene glycol, triethylene glycol and tetraethylene glycol, tetrahydrofuran, ethyl ether and ethers having oxygen replaced by sulfur, N-methylpyrrolidone and N-ethylpyrrolidone.

16. A method for preparing vinyl thioethers which comprises introducing acetylene into a liquid mixture comprising a thiol and an inert organic solvent, said solvent being capable of dissolving at least about 18 volumes of acetylene measured at standard conditions per volume of solvent at 0° C. and one atmosphere pressure, the acetylene being introduced at a temperature below about 10° C. under pressure until the dissolved acetylene is at least about equivalent to the thiol to be vinylated, and heating the mixture containing acetylene in liquid phase, in the presence of a strongly basic alkali metal catalyst, at a reacting temperature between 100° and 200° C. under pressure between about 1000 and 5000 pounds per square inch and at least sufficient to maintain the reacting mixture entirely in liquid phase and to prevent desorption of acetylene.

17. The method of claim 16 in which at least a portion of the thiol is added to the liquid mixture after acetylene has been introduced into the inert organic solvent therefor.

18. The method of claim 16 in which the liquid mixture comprises a lower alkanol in addition to the thiol and the solvent for acetylene.

19. The method of claim 16 in which the thiol has the formula $R(SH)_n$, wherein $n$ is an integer from one to two and R is chosen from the following: (1) a saturated aliphatic hydrocarbon group, (2) a group having saturated aliphatic hydrocarbon residues and a substituent from the class consisting of ether, thioether, carboxylic ester, amine, hydroxyl, and amide groups, (3) an aryl group, and (4) a phenylalkyl group.

20. The method of claim 16 in which the thiol is an alkanethiol.

No references cited.